United States Patent [19]

McConnellogue et al.

[11] 4,262,629

[45] Apr. 21, 1981

[54] APPARATUS FOR APPLICATION OF SEALANT TO CAN LIDS

[75] Inventors: Neal J. McConnellogue, Lakewood; Geoffrey J. Dean, Denver, both of Colo.

[73] Assignee: Entech Corporation, Englewood, Colo.

[21] Appl. No.: 835,636

[22] Filed: Sep. 22, 1977

[51] Int. Cl.$^3$ .......................... B05C 5/02; B05C 7/02
[52] U.S. Cl. ...................................... 118/668; 118/318
[58] Field of Search .......................... 118/12, 318, 668

[56] References Cited

U.S. PATENT DOCUMENTS

| | | | |
|---|---|---|---|
| 827,414 | 7/1906 | Brenzinger | 113/80 B |
| 894,540 | 7/1908 | Schionning | 113/80 B |
| 1,004,699 | 10/1911 | Sharp | 113/80 B |
| 1,811,162 | 6/1931 | Troyer et al. | 113/80 B |
| 2,233,774 | 3/1941 | Diezel | 113/80 B |
| 2,313,750 | 3/1943 | Hothersall | 113/121 R X |
| 3,015,302 | 1/1962 | Miller et al. | 118/318 |
| 3,015,303 | 1/1962 | Stohlquist | 118/318 |
| 3,019,938 | 2/1962 | Miller et al. | 113/121 R X |
| 3,898,954 | 8/1975 | Galitz | 118/318 X |

*Primary Examiner*—Robert Mackey
*Attorney, Agent, or Firm*—John E. Reilly

[57] ABSTRACT

A can end lining mechanism has been devised for sequentially advancing can ends from a downstacker mechanism into registry with each of a series of can end receiving recesses in a rotary chuck table where as each can is advanced into a recess it is simultaneously lifted, rotated about its own axis, and rotated about the axis of the chuck table while sealant is applied to the peripheral groove of the can end for a predetermined time interval, after which the lined end is released and the centrifugal force of rotation of the table is sufficient to discharge the end. Feed interrupt mechanism is provided throughout in order to interrupt delivery of the ends from the feed area as well as to interrupt the application of sealant when a can lid is not properly in position. Synchronous drive means are provided for coordinating the movement of the can lids from the feed area through the discharge station.

14 Claims, 12 Drawing Figures

APPARATUS FOR APPLICATION OF SEALANT TO CAN LIDS

This invention relates to novel and improved apparatus for handling and lining can ends and the like, and more particularly relates to a novel and improved means for the automated stacking, delivery and lining of can lids at extremely high rates of speed.

BACKGROUND OF THE INVENTION

In the mass production of cans, the can lids are formed with an annular groove to which is applied a sealant compound or end lining material as a preliminary to application of the lid to the can body whereby the lining material will form an effective seal between the lid and the end of the can body. The ever-increasing rates of production of can bodies and lids presents a need for end lining machinery capable of handling and lining cans at extremely high rates of speed without requiring the use of a number of machines thereby minimizing the resultant space, labor and cost requirements.

Various machines have been devised for high rate can end lining operations. Representative machines are those which form the subject of U.S. Pat. Nos. 827,414 (Brenzinger), 894,540 (Schionning, 1,004,699 (Sharp), 1,811,162 (Troyer et al), 2,233,774 (Diezel), 2,313,750 (Hothersall), 3,015,303 (Stohlquist) and 3,019,938 (Miller). Of these, the patents to Brenzinger and Sharp disclose multistation tables or supports for advancing can lids successively past a sealant gun. Troyer et al discloses an apparatus for stacking can ends together with a sealant gun mounting with associated means to cut off the discharge of sealant from the gun in the event that a can end is not properly in place. Stohlquist is directed to automated machinery for advancing can ends from a stacked area through a sealant station and into another stacked area by using a common carrier mechanism.

SUMMARY OF THE INVENTION

It is an object of the present invention to provide for novel and improved means for handling and lining can ends at extremely high rates of speed which requires a minimum of attention and is highly dependable and efficient in use.

It is another object of the present invention to provide for a novel and improved apparatus for sequentially advancing can ends from a stack onto a continuously rotating table in which one or more sealant guns are activated in response to reception of each can lid in succession on the table to deliver a predetermined amount of sealant to the lid without danger of compound build-up; and further wherein the sealant gun itself is mounted with respect to the table so as to permit accurate lateral and vertical adjustment in order to be adaptable for use with can lids of different sizes.

A further object of the present invention is to provide for a novel, compact apparatus for handling and lining a succession of can lids at high rates of speed in which the can lids are positively engaged throughout from a stacking area to a discharge area and the sealant gun for each can lid to be treated is responsive automatically to proper positioning of the can lids with respect to the gun.

It is an additional object of the present invention to provide for a novel and improved end lining apparatus in which a chuck table is capable of handling and treating a maximum number of can lids while under continuous rotation and in such a way as to apply sealant to and line the maximum number of can lids for given number of speed and power limitations.

It is a still further object of the present invention to provide for a novel and improved end lining apparatus for can ends and the like in which counter-rotating members are employed for continuous advancement and treatment of the maximum number of can ends and feed interrupt means are provided to automatically interrupt advancement of can ends from a downstacker area and the supply of sealant in the event of misalignment of a can lid. In accordance with the present invention, a preferred form of end liner mechanism is adapted to sequentially feed can lids into position for application of a sealant along an outer peripheral groove of the lid as a preliminary to sealing of the lids onto the ends of can bodies wherein the delivery of the lids and the sealant operation is fully automated and closely coordinated so as to permit the handling and treatment of the lids at extremely high rates of speed. In the preferred embodiment, a rotary can lid feed mechanism is provided with a series of pockets which are advanced through a downstacker area to laterally shift each lowermost lid in succession of the stack of lids along an arcuate guide path into each of a series of shallow recesses formed in a rotary chuck table. The rotary chuck table has a series of lift chucks disposed in normally lowered position beneath the recesses, and a rotary drive is operative to synchronously rotate the table and lift chucks at a predetermined rate of speed. A cam member located in the path of travel of the lift chucks is operative to advance each lift chuck in succession when it is received at a first station between a normally lowered position and a raised position through a distance corresponding to two stations, after which the cam is lowered as it is advanced to a third station and discharged into a collection area. The empty recess then continues through a distance corresponding to three more stations before it picks up another can lid. An upper sealant gun assembly includes a spring-loaded chuck aligned with each recess so as to be engageable with each lid as it is raised by the lift chuck to activate an associated sealant gun in response to such engagement. The sealant is discharged from the gun as the can lid is caused to rotate about its own axis by rotation of the lift chuck through the first two stations so as to uniformly deposit the lining material into the groove of each can lid in succession. Again, following application of the sealant, the can lid is lowered by the lift chuck then disengaged so as to permit the can lid to be discharged from the table preferably by the rotary speed of rotation of the table into a discharge or collection area.

Feed interrupt mechanism is provided for interrupting advancement of the can lids from the downstacker area in passing in the event of misalignment of a lid; also an interrupt mechanism is provided in association with the sealant gun to interrupt delivery of sealant in the event that the can lid is not properly aligned with respect to a recess on the chuck table. Preferably, both interrupt mechanisms are controlled by a common sensor in the rotary feed mechanism; however, a separate sensor is provided on the upper chuck assembly to interrupt supply of sealant.

The foregoing and other objects, advantages and features of the present invention will be more readily understood and appreciated from a consideration of a preferred embodiment when taken in conjunction with the accompanying drawings, in which:

DETAILED DESCRIPTION OF THE PREFERRED EMBODIMENT

Figure 10:
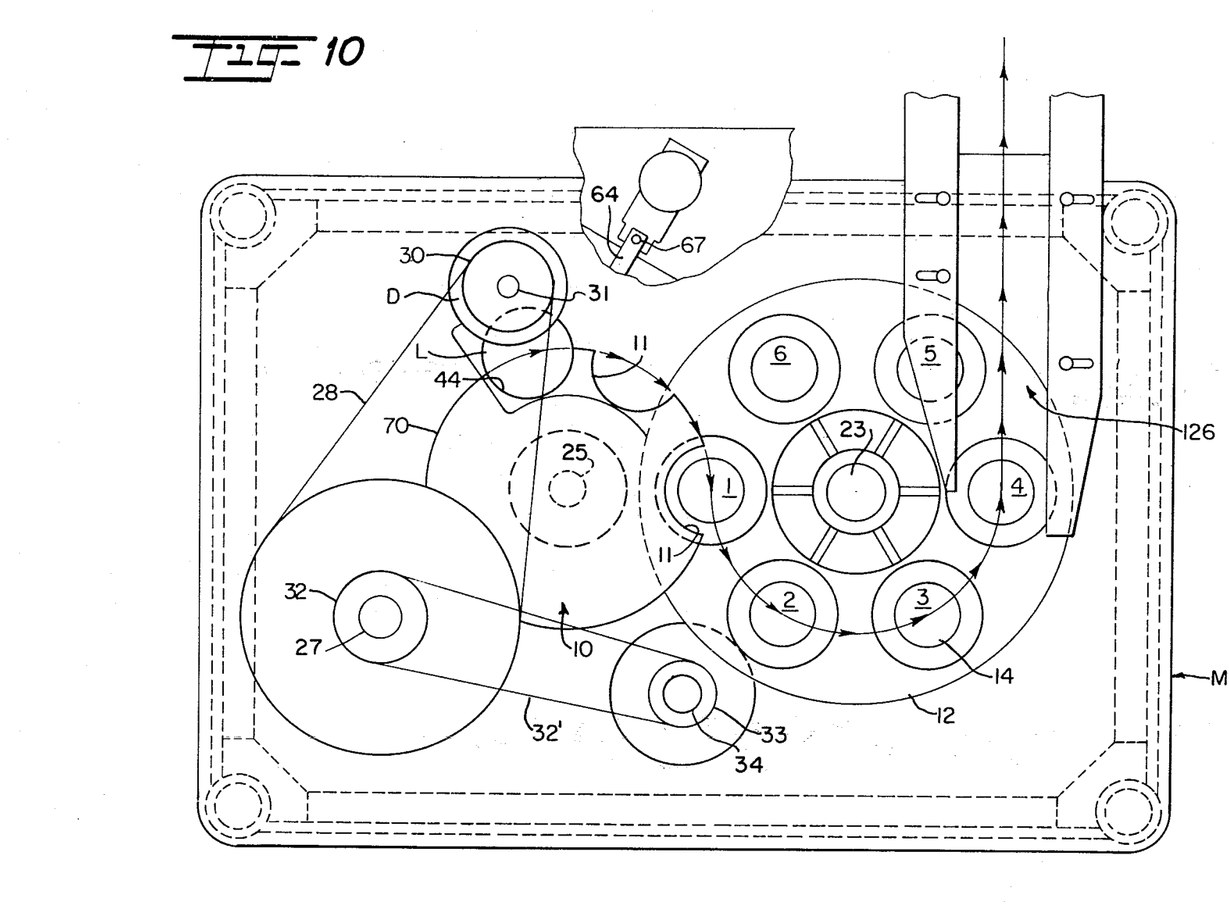
FIG. 10 is a top plan view showing the interrelationship between the downstacker mechanism, star wheel and chuck assemblies.

In the preferred embodiment of the present invention, an end liner mechanism M is illustrated in FIGS. 1 to 10 which is adapted to sequentially feed can lids L into position for application of a sealant along a peripheral groove G located adjacent to an outer surrounding rim R. From a consideration of FIGS. 1, 3 and 10, high speed handling and application of sealant to each end is achieved broadly through close coordination between a star wheel 10 and counter-rotating chuck table 12, the star wheel 10 having a series of pocket 11 which successively advance across a guide slot 47 in a downstacker mechanism D to engage a can lid and feed it into registry with a can lid-receiving opening 14 in the chuck table 12. Each of a series of rotatable lift chuck mechanisms 15 is disposed in a normally lowered position beneath an associated opening 14 as each can lid is initially delivered into registry with the opening at a first station "1," and each respective lift chuck is raised under rotation of the chuck table 12 to lift the can lid L into engagement with an upper chuck assembly 16 as the can lid L is advanced through stations "2" and "3" as illustrated in FIG. 10. Movement of the can lid against the upper chuck assembly simultaneously causes a sealant gun 17 traveling with each upper chuck assembly to be activated to inject a predetermined amount of sealant or liner material into the outer groove G of the can lid, the can lid being rotated independently about its own axis by rotary drive means in the form of a series of drive spindles 37 and spur gears 18 for each lift chuck 15 in synchronism with rotation of the chuck table.

Figures 1, 2:
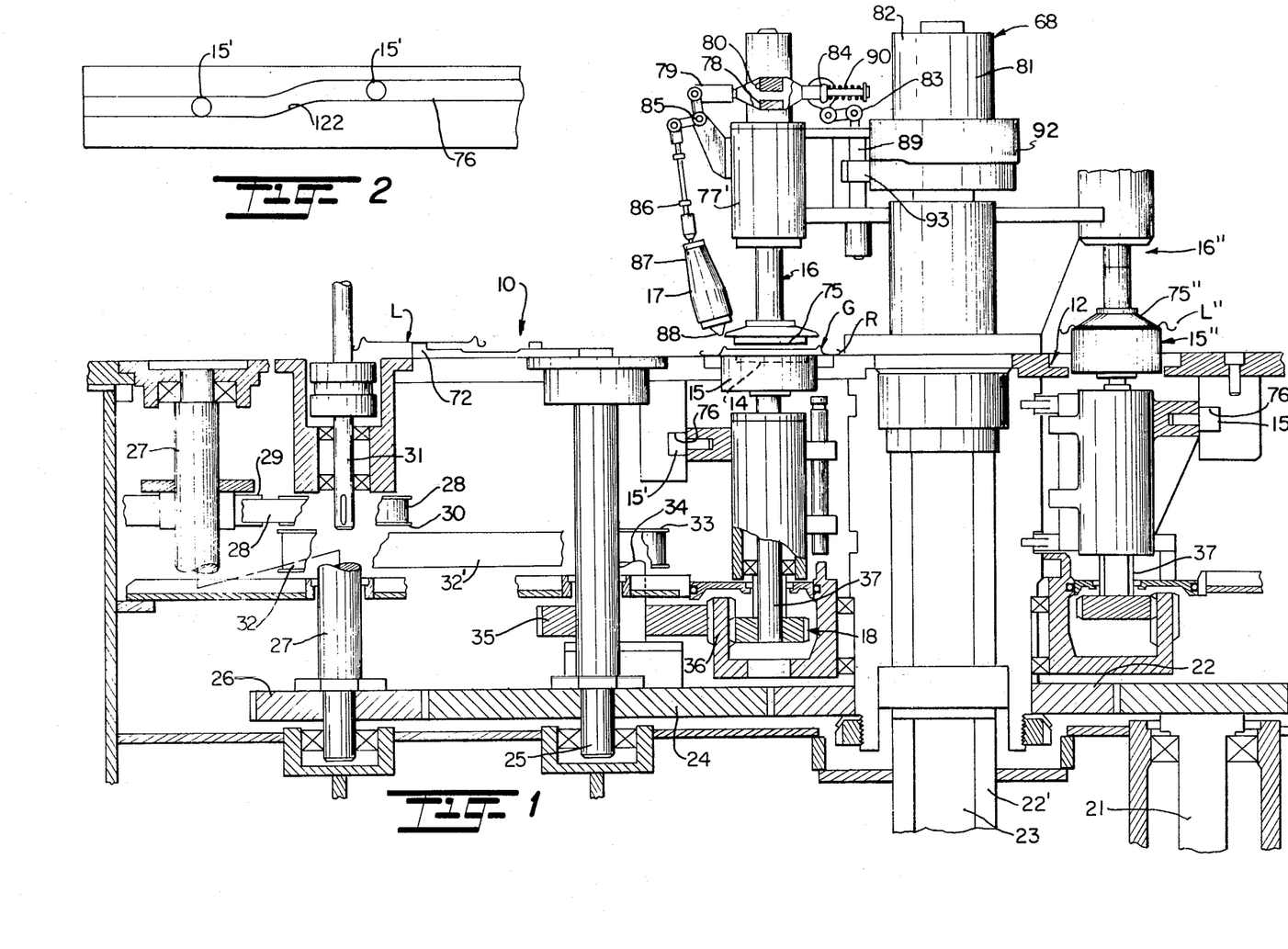
FIG. 1 is a front view partially in section of a preferred form of chuck assembly and drive sytem in accordance with the present invention.
FIG. 2 is a fragmentary view showing the development of the cam surface employed to control lifting and lowering of the individual lift chuck members beneath the chuck table.

Referring to FIG. 1, preferably a common drive is employed to impart the desired synchronous rotation to the star wheel 10, chuck mechanisms 15 and 16 as well as the downstacker mechanism D. To this end, a main drive motor, not shown, rotates a drive shaft 21 and a spur gear 22 which is keyed for rotation of an outer sleeve 22' journaled on the main spindle 23 and which rotatEs the chuck table 12 and upper chuck assembly 16 in unison. The spur gear 22 also imparts rotation through another spur gear 24 to drive a star wheel jack shaft 25 for rotating the star wheel 10. Still another spur gear 26 is driven off of spur gear 24 to drive another jack shaft 27, the latter being operative to drive a timing belt 28 trained over a drive pulley 29 on the shaft 27 and a driven pulley 30 keyed to a downstacker drive shaft 31. The jack shaft 27 also drives a pulley 32 for timing belt 32' which is trained over a driven pulley 33 at the lower end of the lift chuck drive shaft 34. The shaft 34 operates through a spur gear 35 to engage a planetary gear 36 disposed in surrounding relation to a circular array of chuck drive spindles 37 which are aligned beneath the openings 14 in the chuck table. The planetary gear 36 rotates a series of the spur gears 18 for the respective chuck drive spindles 37 so as to rotate the spindles and associated lift chucks 15 for the can lids independently of the main spindle 23.

For the purpose of illustration, the drive ratio between the spur gears 22 and 24 is one to one and, for example, may be 400 rpm; spur gear 26 is sized also to rotate at 400 rpm and through timing belt 28 will rotate the downstacker shaft at 1200 rpm. The lift chuck spur gear 35 is driven at a speed of 600 rpm and through gear 36 will impart rotation of the lift chuck shafts 37 at a rate of 2000 rpm. As a result, the individual lift chucks 15 will undergo two revolutions in advancing from the first to the third stations as the sealant is injected into the groove of each can lid.

Considering in more detail the construction and arrangement of the preferred form of downstacker mechanism, as shown in FIGS. 3 to 10, a conventional form of feeder mechanism, not shown, but which may suitably be a delivery tube or chute forming an upward extension of downstacker area 44 is operative to effect continuous delivery of can lids L into the downstacker area 44 where the can lids are disposed upside down in a stack and are individually guided into a receptacle area to be described by a pair of feed screws F in a conventional manner. In addition, cutoff blades 46 are located on diametrically opposite sides above the feed screws F toward the bottom of the downstacker area 44 but displaced 90 degrees from the feed screws. Each cutoff blade 46 is of generally semi-circular configuration being pivotal about a pivot pin 48 disposed in the main downstacker housing 49. The circular edge of each blade is provided with gear teeth 50 which intermesh with teeth located on ring gear 51. Inclined, relatively straight edges 52 extend across one end of each blade in confronting relation to a guide slot 47. When it is desired to interrupt feeding of the can lids through the downstacker area, rotation is imparted to the ring gear 51 by a piston 53 which has the end of its rod pivotally connected to an ear 54 projecting radially outwardly from the ring gear 51 so that retraction of the piston rod will cause the cutoff blades to rotate in a direction advancing one of the relatively straight edges 52 on each blade inwardly toward one another across the path of movement of the can lids. Conversely, extension of the piston will cause the blades to swing out of the path of the lids thereby permitting one of the lids to drop onto the diametrically opposed feed screws F. The feed screws F are mounted on shafts 57 and 57' so as to be disposed below the level of the cutoff blades 46. The jack shaft 27 is drivingly connected through the downstacker drive shaft 31 to rotate a pin coupling 55 at the lower end of the shaft 57. The shaft 57 has a pinion 56' at its upper end and which through the ring gear 56 rotates the gear 56' on the other shafts 57' for synchronous rotation of the shafts 57, 57' and the feed screws F.

Figure 8:
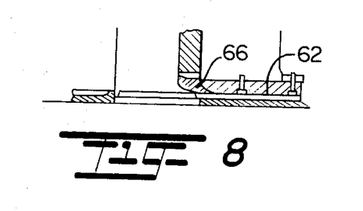
FIG. 8 is a cross-sectional view taken about lines 8—8 of FIG. 4.
Figure 9:
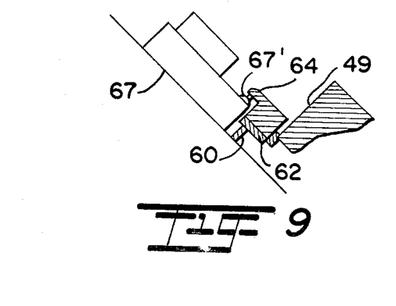
FIG. 9 is a cross-sectional view taken about lines 9—9 of FIG. 3.

The Downstacker housing 49 includes an upper flat wall surface 62 around its outer periphery which is closely spaced over a lower parallel plate 63, the upper wall surface 62 terminating in an outer edge or rim 60 which extends downwardly from the wall surface 62 in outer surrounding relation to the lower plate 63. A tab or ear 60' projects outwardly in a radial direction from the rim 60, and a spring-loaded clamp 61 is shown with a pivotal arm 61' normally extending over the ear 60' so as to yieldingly urge the wall 62 downwardly over the plate 63. In addition, an arm 64 is affixed to the upper wall 62 and projects outwardly beyond the rim 60 to rest upon a contact 67' of a microswitch 67 so as to normally depress the contact 67' and maintain the microswitch in an electrically inactive position. However, when the arm 64 is raised away from the contact 67' the contact will be movable upwardly to electrically activate the microswitch 67. The lower plate 63 is a flat guide plate which is slotted as at 47 to define a somewhat arcuate guide path having an edge 65 along one side for advancement of the can lids from the downstacker area. As shown in FIG. 8, a pressure pad 66 is disposed at the inner edge of the upper wall surface 62 in surrounding relation to the guide slot 47 so as to assure that each can lid individually dropped by the feed screws F is fully seated within the guide slot 47. If the lid is not so positioned or seated, it will cause the pressure pad 66 and upper wall surface 62 along with the outwardly projecting ear 60' to be raised against the urging of the clamp 61, and simultaneously will cause the arm 64 to be raised away from engagement with the contact 67' so as to electrically activate the microswitch 67. Microswitch 67 is electrically connected to a suitable control valve, not shown, to activate the piston 53 for rotation of the cutoff blades 46 onto a position to interrupt movement of the can lids through the downstacker housing. When microswitch 67 is activated it will in turn activate the air cylinder 68 associated with the upper chuck assembly to prevent application of sealant in a manner hereinafter described.

Figure 3:
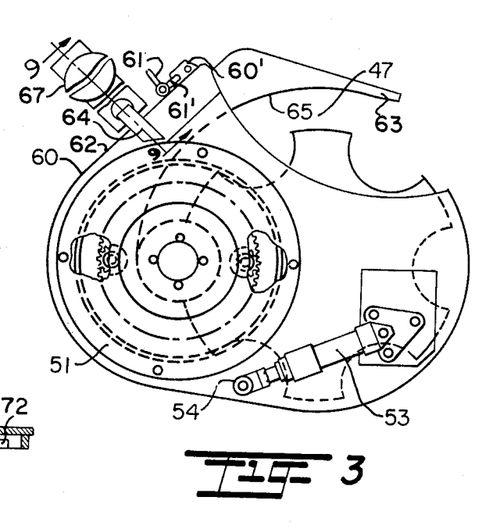
FIG. 3 is a top plan view of a preferred form of downstacker mechanism in accordance with the present invention.
Figure 4:
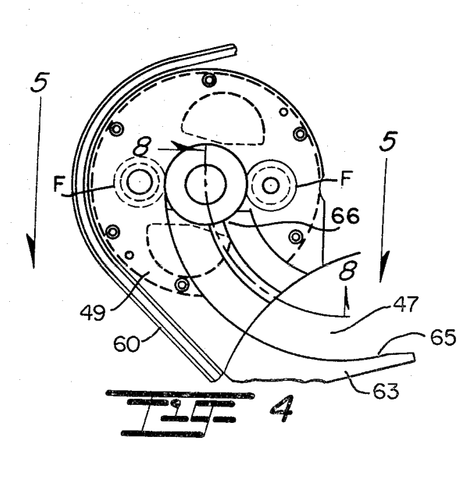
FIG. 4 is a bottom plan view of the preferred form of downstacker mechanism as shown in FIG. 3 with portions broken away for the purpose of clarity.
Figure 5:
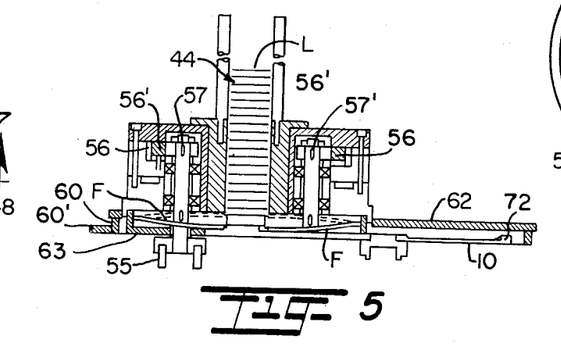
FIG. 5 is a cross-sectional view taken about lines 5—5 of FIG. 4.
Figure 6:
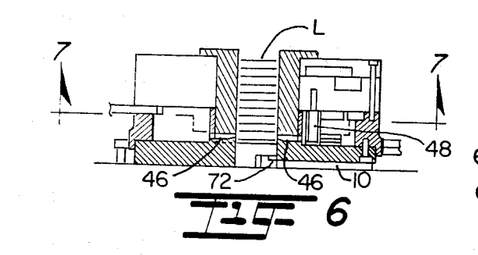
FIG. 6 is a vertical section view taken substantially at 90 degrees from the section view of FIG. 5 and illustrating in more detail the feed screw mechanism of the downstacker area.
Figure 7:
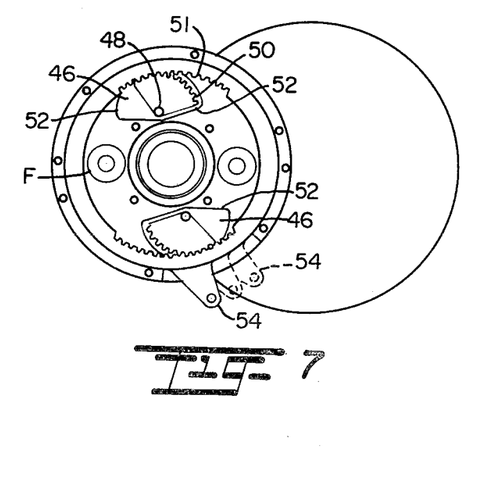
FIG. 7 is a cross-sectional view taken about lines 7—7 of FIG. 6.

The star wheel 10 is disposed in horizontally aligned relation to the guide slot 47; and in the preferred form, the star wheel 10 is in the form of a flat circular plate 70 having a series of pockets or recesses 11 formed at equally spaced circumferential intervals around the outer periphery of the plate. Each pocket is of generally semi-circular configuration so as to be movable into alignment with the guide slot 47 at the bottom of the downstacker area directly opposite to the end of the guide path. Rotation of the star wheel is synchronized with advancement of the can lids so that the arrival of each pocket 11 into alignment with the guide slot will coincide with the advancement of a can lid from the stack. A pusher plate 72 is formed at the outer edge of each pocket 11 to engage the outer rim of each can lid in the slot 47 so as to advance it along the guide path toward the opening in the chuck table as illustrated in FIGS. 3 and 10.

As the chuck table 12 is rotated, each lift chuck 15 includes a cam follower 15' which is advanced along a cam surface 76, suspended beneath a stationary part of the chuck table as shown in FIG. 2, and causes the lift chuck 15 to rise gradually through the respective opening 14 into engagement with the can lid to lift it off of the edge of the recess or opening 14 into engagement with an aligned one of a series of pressure pads 75 on the upper chuck assembly 16. It will be noted that as the can lid is raised against the pressure pad it will lift the center rod 77 through the main housing cylinder of the upper chuck assembly which rod in turn will cause a slotted portion 78 to be lifted or raised into alignment with a pin 80 in a shiftable feed rod 79 for the sealant gun 17. The feed rod 79 and an associated flange or cam follower 93 for each feed rod follow the rotation of their respective chuck assembly 16 and sealant gun 17 with respect to the centrally located air cylinder 82, since each of the assemblies 16 and 17 are mounted for rotation with the outer drive sleeve 22'. As previously described, the outer drive sleeve 22' is operated to drive the upper chuck assemblies 16 in unison with the chuck table 12. As the cam follower 93 advances along the undersurface of the cam 92, the cam 92 causes the cam follower 93 to move downwardly to the dotted line position shown in FIG. 12 during the same time interval or period of each cycle that the feed rod 79 causes the pin 80 to move into alignment with the slot 78. Downward movement of the cam 93 causes the bell crank 83 to move downwardly to retract a clevis pin 84 thereby shifting the feed rod 79 through the slot 78 and drawing bell crank 85 upwardly. The bell crank 85 operates through linkage 86 to draw valve stem 87 upwardly and away from the nozzle or orifice 88 in the sealant gun to permit the flow of sealant therethrough. If the pin 80 is not properly aligned with the slot 78, the feed rod will not be free to shift laterally to open the sealant gun and would therefore interrupt the sealant operation indicating that a can lid is not properly aligned in the opening.

It will be noted that the lower free end of bell crank 83 is attached to a spring-loaded rod 89 to bias the crank 83 in a direction normally permitting lateral shifting of the feed rod 79 against the urging of the spring 90. However, if the air cylinder 68 is activated, it will raise the cam surface 92 away from engagement with the cam follower 93 so as not to activate the sealant gun in the manner described. Thus, in the event of the release of the microswitch 67, it will prevent the bell crank 83 from shifting downwardly as a result of the cam 92 abutting the cam follower 93 affixed to the rod 89.

Figure 12:
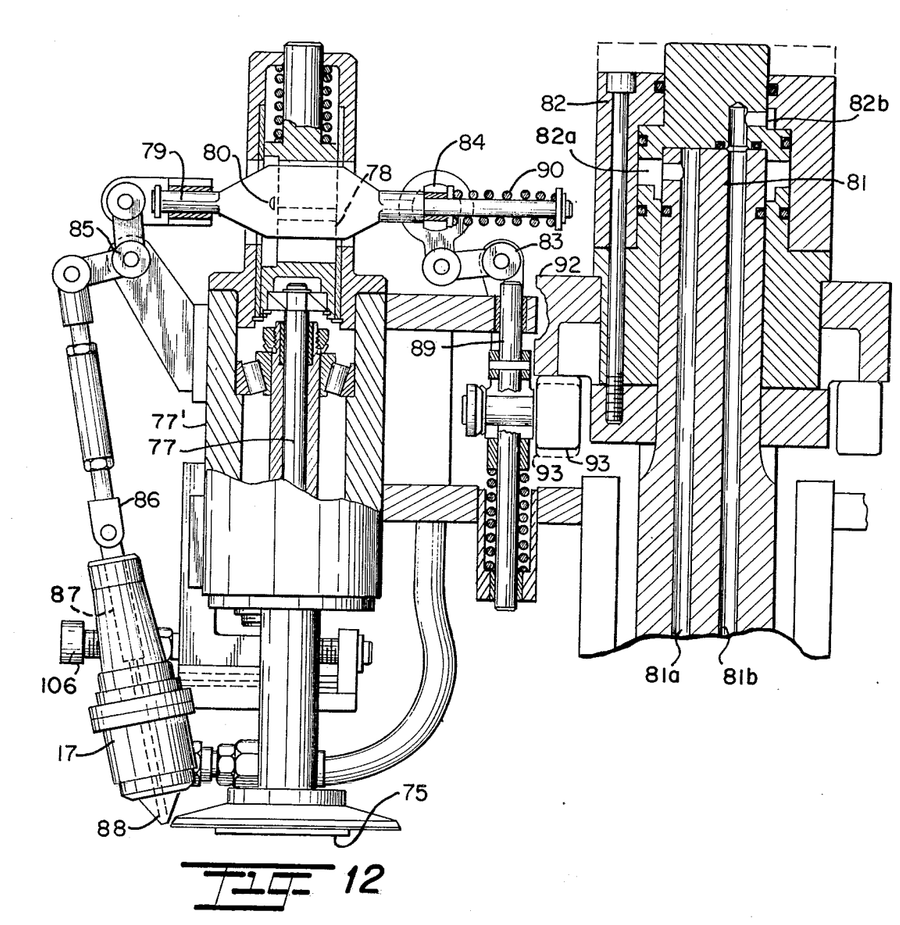
FIG. 12 is an enlarged sectional view of the upper chuck assembly.

As illustrated in FIG. 12, normally air under pressure is directed through the lefthand bore 81a of the piston 81 into the lower annular groove 82a surrounding the upper end of the piston so that the air forces the cam 92 and attached upper moveable end 82 of the cylinder 68 downwardly during normal operation of the cylinder in applying sealant to each of the lids. However, if the microswitch 67 is released as previously described, pressurized air is removed from the lefthand bore 81a and directed into the righthand bore 81b into the uppermost annular recess 82b so as to shift the upper end of the cylinder 68 upwardly as shown and at the same time lifting the cam 92 upwardly away from engagement with the cam follower 93.

Figure 11:
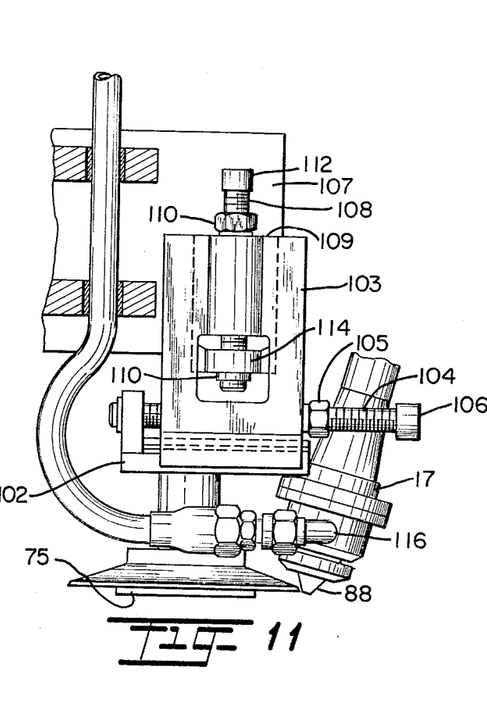
FIG. 11 is an enlarged view of the sealant gun and adjustable mount therefor.

As shown in FIG. 11, the sealant gun 17 is so disposed as to incline downwardly and inwardly with respect to the lift rod so as to terminate in the nozzle 88 located directly above the outer groove of a can lid L, the nozzle or orifice being stationed in close proximity to the pad 75 at the lower end of the lift rod. An adjustable mounting is provided for the sealant gun through a lateral slide member 102 which is supported on an outside mounting block 103 by a threaded stem 104 with lock nuts 105 and an enlarged slotted head 106 so that rotation of the head will cause threaded advancement of the slide 102 in either direction with respect to the block 103. The slide 102 is fixed to the gun 17 and therefore will effect lateral adjustment of the sealant gun, for example, to permit lateral adjustment for different sized can lids. A support block 107 for the sealant gun also includes a vertical slide defined by a threaded stem 108 extending through a threaded sleeve 109 with lock nuts 110 and an enlarged slotted head 112 which is adjustable to cause vertical movement of the sealant gun with respect to the pressure pad and can lid. The vertical stem 108 extends through the sleeve 109 which is fixed to the turret body, and a member 114 at the lower end of the stem 108 is affixed to the support block 107 which is mounted behind the main housing or cylinder 77' for the center rod 77. In this way, as the vertical stem 108 is adjusted it will cause the outer block 103 to move vertically to carry with it the entire lateral slide mechanism. On the other hand, the lateral slide or stem merely imparts movement to the slide member which is disposed in a channel at the lower end of the outside block 103. The sealant supply is run through a hose 116 as shown in FIG. 11 to inject the sealant directly into the lower end of the gun above the nozzle 88.

As shown in FIGS. 1 and 10, the lift chuck mechanism 15 is driven independently of the chuck table by individual drive shafts 37 for each lift chuck mechanism whereby to rotate each individual can lid simultaneously with rotation along or about the axis of the chuck table. Thus, as the lift chuck mechanism is raised along the incline 122 of cam surface 76, as shown in FIG. 2, and is simultaneously rotated, it will advance the groove on the can lid beneath the sealant gun 17 to produce an even layer of sealant along the groove. Preferably, the chuck mechanism will cause the can lid to undergo two revolutions as the chuck table is rotated between station "1" and station "3", or approximately 90 degrees, as best seen from the plan view of FIG. 10. Under continued rotation of the chuck table in advancing the lid from station "3" to station "4" the cam mechanism 15 will be lowered along an inclined ramp of the cam surface 76 which ramp corresponds to the incline 122 but slopes in the opposite direction to that of the incline 122 shown in FIG 2. Thus, by station "4", the lift chuck will have moved downwardly away from the lid and the lid will be discharged outwardly from the opening through the guide passage 126 under the centrifugal force of rotation of the chuck table. Of course, as the lid is lowered in response to lowering of the chuck mechanism 15, it will move away from engagement with the pressure pad on the upper chuck assembly causing the stem on the sealant gun to close the sealant and interrupt the flow of sealant. After station "4", the empty lid receiving opening is advanced through stations "5" and "6" in preparation for receiving the next lid at station "1". Notwithstanding the dwell time between stations "4" and "1", provision for six stations both on the chuck table and the star wheel permits handling of a much greater number of can lids in a given length of time and for a given speed of rotation of the table. Thus, for each revolution of the chuck table, six can lids are handled and lined with sealant at speeds corresponding to that required for advancing a lesser number of lid-receiving recesses in the chuck table. A related advantage is that feed interrupt mechanism is provided at both transfer points between the downstacker and star wheel and the star wheel and chuck table to simultaneously interrupt the delivery of can lids from the downstacker and the supply of sealant. In addition, the upper chuck assembly is independently responsive to the absence of a can lid to cut off the supply of sealant. Specifically, in the absence of a can lid L in the can lid-receiving opening 14 in the chuck mechanism 15 at station 1, as that chuck mechanism 15 is raised under rotation of the chuck table 12, in the absence of the can lid L, the pressure pad 75 will merely enter the can lid receiving opening 14 and the upper chuck assembly 16 will not be lifted to the extent necessary to cause the slot 78 to move into alignment with the pin 80.

While the present invention has been described with particularity relative to the foregoing exemplary preferred embodiment, various changes, modifications, additions and applications other than those specifically mentioned herein will be readily apparent to those having normal skill in the art without departing from the spirit of this invention.

We claim:

1. An end liner mechanism adapted to sequentially feed can lids into position for application of a sealant into an outer annular groove of each lid, comprising:

a rotary table including a plurality of circumferentially spaced recesses each sized to receive a can lid in substantially parallel relation to the upper surface of said table, a lift chuck member disposed in a normally lowered position beneath each of said recesses, rotary drive means for synchronously rotating said table and each of said lift chuck members at a predetermined rate of speed whereby said lift chuck members are rotated about their own axes while rotating with said table, a cam member in the path of travel of said lift chuck member for causing each of said lift chuck members to be advanced between a normally lowered position and a raised position extending upwardly into a respective recess to engage a can lid positioned in that recess and thereafter to return to its normally lowered position;

can lid feed means operative to successively shift a can lid into registry with each recess in succession on said rotary table;

an upper chuck assembly including a spring-loaded pressure pad aligned with each of said recesses and rotatable with said rotary table, each pressure pad disposed to be engageable with a can lid when the can lid is raised by a corresponding lift chuck member, and discharge means on said rotary table in the path of movement of said can lids whereby to advance each can lid away from said rotary table for discharge as each said lift chuck member is movable in a direction returning to its normally lowered position after sealant application and under continued rotation of said table from a respective recess; and a sealant gun assembly associated with each of said pressure pads including feed control means operative in response to engagement of a can lid with a pressure pad to be raised to shift said feed control means to an open position for application of sealant along the outer peripheral groove of each can lid as it is rotated by said lift chuck.

2. An end liner mechanism according to claim 1, each of said sealant gun assemblies being mounted adjacent to a respective pressure pad and provided with a nozzle directed downwardly into alignment with a can lid interpositioned between a lift chuck member and upper pressure pad.

3. An end liner mechanism according to claim 2, including means for mounting each said sealant gun assembly with respect to said pressure pad so as to be laterally and vertically adjustable independently of said pressure pad.

4. An end liner mechanism according to claim 1, said upper chuck assembly including a support rod extending upwardly from each of said pressure pads, bias means normally biasing each support rod and associated pressure pad in a downward direction, said feed control means including activating means movable in a direction to cause opening of an orifice in each sealant gun assembly associated with a pressure pad for injection of sealant therefrom, said activating means being energized in response to raising of said pressure pad against the urging of said bias means whereby to open the orifice on the associated sealant gun only when said pressure pad is raised as a result of engagement with a can lid.

5. An end liner mechanism according to claim 4, each said support rod normally disposed in a position interrupting movement of said activating means when said pressure pad is in its lowered position and provided with a slot therein, each support rod movable in response to raising of said pressure pad upon engagement with a can lid to advance its slot into alignment with said activating means to permit said activating means to advance in a direction causing the orifice on an associated sealant gun assembly to be opened.

6. An end liner mechanism according to claim 1, in which said can lid feed means includes a rotary wheel disposed in axially spaced relation to said rotary table and rotatable in counter-rotation to said rotary table, said rotary wheel having can lid engaging means movable into registry with each of a plurality of can lids in succession to advance each lid successively into registry with a recess in said rotary table.

7. An end liner mechanism according to claim 6, said can lid feed means defined by generally semi-circular pockets in the outer periphery of said rotary wheel and raised portions along at least a portion of each pocket.

8. An end liner mechanism according to claim 7 including drive means for said wheel rotated synchronously off of said rotary drive means for said rotary table to coordinate rotation of said wheel with respect to said table, the number of pockets on said wheel corresponding to the number of recesses on said table.

9. An end liner mechanism according to claim 8, said plurality of can lids arranged in a stack, said can lid feed means including an arcuate guide slot located beneath said stack of can lids and cooperative with each of said pockets on said wheel to guide each can lid in succession from said stack onto each of said pockets of said rotary wheel.

10. An end liner mechanism adapted to sequentially feed can lids from a stack of lids into position for application of a sealant into an outer annular groove of each lid, comprising:

a rotary table including a plurality of circumferentially spaced can lid-receiving recesses each sized to receive a can lid in substantially aligned parallel relation to the upper surface of said table, a lift chuck member disposed in a normally lowered position beneath each of said recesses, rotary drive means for synchronously rotating said table and each of said lift chuck members at a predetermined rate of speed whereby said lift chuck members are rotated about their own axes while rotating with said table through a plurality of stations including in succession a can lid-receiving station, at least one sealant-applying station, a discharge station, and at least one dwell station, a cam member in the path of travel of said lift chuck members for causing each lift chuck member to be advanced between a normally lowered position at the can lid-receiving station and a raised position extending upwardly into a respective recess to engage a can lid positioned in that recess at each sealant-applying station and thereafter to return to its normally lowered position for movement through the discharge and dwell stations;

an upper chuck assembly including a pressure pad aligned with each of said recesses and rotatable with said rotary table, and sealant-applying means operative to apply sealant along the outer peripheral groove of each can lid as it is rotated by a lift chuck member through said sealant applying station;

can lid feed means operative to shift a lid from said stack of lids into registry with each recess in succession on said rotary table as the recess traverses the can lid-receiving station, said feed means including cut-off blade members disposed on diametrically opposed sides of said stack of can lids, each of said cut-off blades including means in the form of a blade edge movable into and away from engagement with vertically spaced can lids in the stack, drive means for rotating said blade members whereby said blade members are movable into engagement with a can lid in the stack to support the lids above the can lid; a shallow receptacle located beneath said stack of can lids; an arcuate guide slot extending from communication with said shallow receptacle in a substantially horizontal direction away from said stack; and can lid engaging means movable into alignment with said guide slot and operative to engage the lowermost can lid in the stack to advance it along said arcuate guide slot into registry with each recess.

11. An end liner mechanism according to claim 10, said can lid-receiving recesses being disposed at equally spaced circumferential intervals and the spacing between successive can lid-receiving recesses defining the spacing between successive stations, there being at least one sealant-applying station during which sealant is applied to each can lid as it is supported in a raised position by a lift chuck member, a single discharge station and at least one dwell station during which each lift chuck member is disposed in a lowered position.

12. An end liner mechanism according to claim 11, there being at least one dwell station intervening between the discharge station and the return of each recess to the first can lid-receiving station.

13. An end liner mechanism according to claim 11 in which said can lid engaging means is in the form of a rotary wheel disposed in axially spaced relation to said rotary table and being rotatable in counter-rotation to said rotary table, and a plurality of generally semi-circular pockets disposed along the outer peripheral surface of said wheel, the number of pockets corresponding to the number of can lid-receiving recesses on said rotary table.

14. An end liner mechanism according to claim 13, further including sensing means associated with said can lid feed means for sensing misalignment of a can lid delivered from said feed means onto said wheel, and limit stop means responsive to said sensing means to energize said blade drive means whereby to interrupt delivery of lids in the event of misalignment of a lid delivered from said can lid feed means.

* * * * *

UNITED STATES PATENT AND TRADEMARK OFFICE
CERTIFICATE OF CORRECTION

PATENT NO. : 4,262,629

DATED : April 21, 1981

INVENTOR(S) : Neal J. McConnellogue; Geoffrey J. Dean

It is certified that error appears in the above—identified patent and that said Letters Patent is hereby corrected as shown below:

Column 2, line 13, after "lid.", start a new paragraph.

Column 3, line 50, cancel "pocket" and substitute -- pockets --.

Column 4, line 10, cancel "rotatEs" and substitute -- rotates --.

Column 5, line 11, cancel "shafts" and substitute -- shaft --.

Column 5, line 47, cancel "onto" and substitute -- into --.

Claim 10, Column 10, line 27, after "sealant", add -- - --.

Signed and Sealed this

First Day of September 1981

[SEAL]

Attest:

GERALD J. MOSSINGHOFF

*Attesting Officer*     *Commissioner of Patents and Trademarks*